(12) United States Patent
Wang et al.

(10) Patent No.: US 9,466,821 B2
(45) Date of Patent: Oct. 11, 2016

(54) BATTERY PACK

(71) Applicant: Samsung SDI Co., Ltd., Yongin, Gyeonggi-do (KR)

(72) Inventors: Han-Jun Wang, Yongin (KR); Dae-Yon Moon, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 186 days.

(21) Appl. No.: 13/935,361

(22) Filed: Jul. 3, 2013

(65) Prior Publication Data

US 2014/0212697 A1    Jul. 31, 2014

(30) Foreign Application Priority Data

Jan. 29, 2013    (KR) ........................ 10-2013-0010096

(51) Int. Cl.
| | | |
|---|---|---|
| *H01M 2/20* | (2006.01) | |
| *H01M 2/34* | (2006.01) | |
| *H01M 10/42* | (2006.01) | |
| *H01M 2/10* | (2006.01) | |
| *H01M 10/052* | (2010.01) | |

(52) U.S. Cl.
CPC ........... *H01M 2/204* (2013.01); *H01M 2/1061* (2013.01); *H01M 2/34* (2013.01); *H01M 10/425* (2013.01); *H01M 10/052* (2013.01); *H01M 2200/00* (2013.01)

(58) Field of Classification Search
None
See application file for complete search history.

(56) References Cited

U.S. PATENT DOCUMENTS

| | | | |
|---|---|---|---|
| 8,323,823 B2 | 12/2012 | Kaneko | |
| 2008/0176131 A1* | 7/2008 | Byun | H01M 2/0215 429/122 |
| 2009/0246620 A1* | 10/2009 | Lee et al. | 429/176 |
| 2010/0239895 A1* | 9/2010 | Yang et al. | 429/53 |
| 2010/0266881 A1* | 10/2010 | You et al. | 429/56 |
| 2011/0052938 A1 | 3/2011 | Lee | |
| 2011/0248676 A1* | 10/2011 | Kim | 320/118 |
| 2012/0225334 A1* | 9/2012 | Lee | 429/62 |
| 2012/0257349 A1* | 10/2012 | Bang et al. | 361/679.55 |
| 2012/0276419 A1 | 11/2012 | Park | |

FOREIGN PATENT DOCUMENTS

| | | |
|---|---|---|
| JP | 2003-077441 A | 3/2003 |
| KR | 1020020012397 | 2/2002 |
| KR | 2009-0103404 A | 10/2009 |
| KR | 1066001 B | 9/2011 |
| KR | 2012-0029837 A | 3/2012 |

OTHER PUBLICATIONS

Office Action dated Jan. 29, 2014 for corresponding KR Application No. 10-2013-0010096.

* cited by examiner

*Primary Examiner* — Patrick Ryan
*Assistant Examiner* — Wyatt McConnell
(74) *Attorney, Agent, or Firm* — Knobbe Martens Olson & Bear LLP (57) ABSTRACT

Provided is a battery pack that includes: unit batteries disposed in parallel with each other and the unit batteries are prismatic type; a connecting substrate for electrically coupling the unit batteries; a plurality of tabs which extend from the connecting substrate, electrically connect the unit batteries and the connecting substrate, and are bent so that the connecting substrate is adjacently disposed to first surfaces of the unit batteries; a protection circuit module electrically connected with the connecting substrate; and a lead which extends from the protection circuit module, electrically connect the connecting substrate and the protection circuit module and are bent so that the protection circuit module is adjacently disposed to second surfaces of the unit batteries.

20 Claims, 5 Drawing Sheets

BATTERY PACK

RELATED APPLICATION

This application claims the benefit of Korean Patent Application No. 10-2013-0010096, filed on Jan. 29, 2013, in the Korean Intellectual Property Office, the disclosure of which is incorporated herein in its entirety by reference.

BACKGROUND

1. Field of the Invention

One or more embodiments of the present invention relate to battery packs.

2. Description of the Related Technology

Secondary batteries may be charged or discharged, unlike primary batteries that may not be charged. Therefore, the secondary batteries, are widely used in the field of compact, up-to-date electronic equipment such as mobile phones, personal digital assistants (PDAs), and laptop computers and also energy storage systems.

Depending on the type of external electronic devices, rechargeable batteries may be used in the form of a single battery or in the form of a plurality of electrically connected batteries. For example, small-sized devices such as mobile phones can operate for a prescribed period of time with power and capacity of one battery. However, medium-sized or large-sized devices such as notebook computers, portable digital video discs (DVDs), and mini personal computers (PCs) require the use of a plurality of batteries due to the need of large capacity and large amounts of power.

The medium-sized or large-sized devices may use a battery pack in which a protection circuit is connected to a plurality of batteries which are connected in series and/or in parallel with each other. In order to provide enough power and capacity when manufacturing the battery pack, the electrical connection between the batteries should be stably achieved. Since there is increasing demand for miniaturized and compact electronic devices, battery packs included in the electronic devices are required to become more compact and miniaturized.

SUMMARY OF CERTAIN INVENTIVE ASPECTS

One or more embodiments of the present invention include battery packs that have high space utilization and are easy to manufacture.

Additional aspects will be set forth in part in the description which follows and, in part, will be apparent from the description, or may be learned by practice of the presented embodiments.

According to one or more embodiments of the present invention, there is provided a battery pack that includes: unit batteries disposed in parallel with each other and the unit batteries are prismatic type;

a connecting substrate for electrically coupling the unit batteries; a plurality of tabs which extend from the connecting substrate, electrically connect the unit batteries and the connecting substrate, and are bent so that the connecting substrate is disposed adjacent to first surfaces of the unit batteries; a protection circuit module electrically connected with the connecting substrate; and a lead which extends from the protection circuit module, electrically connecting the connecting substrate and the protection circuit module and is bent so that the protection circuit module is disposed adjacent to second surfaces of the unit batteries.

According to one feature of the present invention, each of the tabs may be bent so that one side of each tab and the other side thereof are substantially in parallel with each other.

According to another feature of the present invention, the lead may be bent so that one side of the lead and the other side thereof are substantially perpendicular to each other.

According to another feature of the present invention, the connecting substrate may be disposed adjacent to upper surfaces of the unit batteries by the bent tabs.

According to another feature of the present invention, each unit battery may include a negative electrode and a positive electrode on the upper surface thereof, and a width of the connecting substrate may be substantially equal to a width of the upper surface of the unit battery.

According to another feature of the present invention, the protection circuit module may be disposed adjacent to the side surface of the unit batteries by the bent lead.

According to another feature of the present invention, the protection circuit module may be disposed along a substantially perpendicular direction to the connecting substrate.

According to another feature of the present invention, the connecting substrate may include a temperature device which is disposed on a first surface of the connecting substrate.

According to another feature of the present invention, the temperature device may be disposed to face the first surface of the unit batteries.

According to another feature of the present invention, the connecting substrate may further include a protrusion which is formed on the first surface of the connecting substrate.

According to another feature of the present invention, the height of the protrusion may be substantially the same as the height of the temperature device.

According to another feature of the present invention, a first surface of the protection module circuit may include a first area that is in contact with the lead; and a second area which is formed around the first area and protrudes relatively from the first area to thus form a step.

According to another feature of the present invention, one surface of the lead is adjacent to the first area, and the first area and the second surface of the unit batteries are spaced away from each other to form a gap.

According to another feature of the present invention, each of the unit batteries may include an electrode assembly which includes a positive electrode plate, a negative electrode plate, and a separator which is interposed between the positive electrode plate and the negative electrode plate, and a can that includes a metallic material and accommodates the electrode assembly.

According to another feature of the present invention, each of the tab and the lead may include a notch which is formed in a widthwise direction.

According to another aspect of the present invention, there is provided a battery pack that includes: unit batteries disposed in parallel with each other; a connecting substrate for electrically coupling the unit batteries; a plurality of tabs electrically connect the unit batteries and the connecting substrate such that the unit batteries and the connecting substrate are electrically coupled, one side of each tab is welded to the connecting substrate and the other side thereof is welded to an electrode of each unit battery, and the tabs are bent so that the connecting substrate is disposed adjacent to first surfaces of the unit batteries; a protection circuit module electrically connected with the connecting substrate; and a lead electrically coupling the connecting substrate and the protection circuit module, one side of the lead is connected to the protection circuit module and the other side thereof is connected to the connecting substrate, and the lead is bent so that the protection circuit module is disposed adjacent to second surfaces of the unit batteries.

According to one feature of the present invention, each of the first surfaces of the unit batteries is an upper surface of each unit battery in which a positive electrode and a negative electrode are formed, and the second surfaces of the unit batteries may be side surfaces of the unit batteries.

According to another feature of the present invention, the connecting substrate may further include a temperature device which is formed on a surface which faces the first surfaces of the unit batteries.

According to another feature of the present invention, the connecting substrate may further include a protrusion which is formed on the surface which faces the first surfaces of the unit batteries and protrudes toward the first surfaces of the unit batteries.

According to another feature of the present invention, a surface which faces the second surfaces of the unit batteries in the protection circuit module may include a first area that is in contact with the lead; and a second area which is formed around the first area and protrudes relatively from the first area to form a step.

According to an embodiment of the present invention, as described above, an electrical connection of a plurality of unit batteries may be easily and stably accomplished through only relatively simple welding by using a connecting substrate.

In addition, the connecting substrate and the protection circuit module are positioned adjacent to the unit batteries by bent tabs and bent leads, thereby maximizing space utilization of the battery pack and providing compactness.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While exemplary embodiments are capable of various modifications and alternative forms, embodiments thereof are shown by way of example in the drawings and will herein be described in detail. It should be understood, however, that there is no intent to limit exemplary embodiments to the particular forms disclosed, but on the contrary, exemplary embodiments are to cover all modifications, equivalents, and alternatives falling within the scope of the invention. In describing the present invention, when practical descriptions with respect to related known functions and configurations may unnecessarily make the scope of the present invention unclear, the descriptions thereof will be omitted. It will be understood that, although the terms 'first', 'second', etc. may be used herein to describe various elements, these elements should not be limited by these terms. These terms are only used to distinguish one element from another.

The terminologies used herein are for the purpose of describing embodiments only and are not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, like reference numerals denote like elements, and the sizes and thicknesses of layers and regions are exaggerated for clarity. It will also be understood that when a layer is referred to as being "on" another layer or substrate, it can be directly on the other layer or substrate, or intervening layers may also be present.

Figure 1:
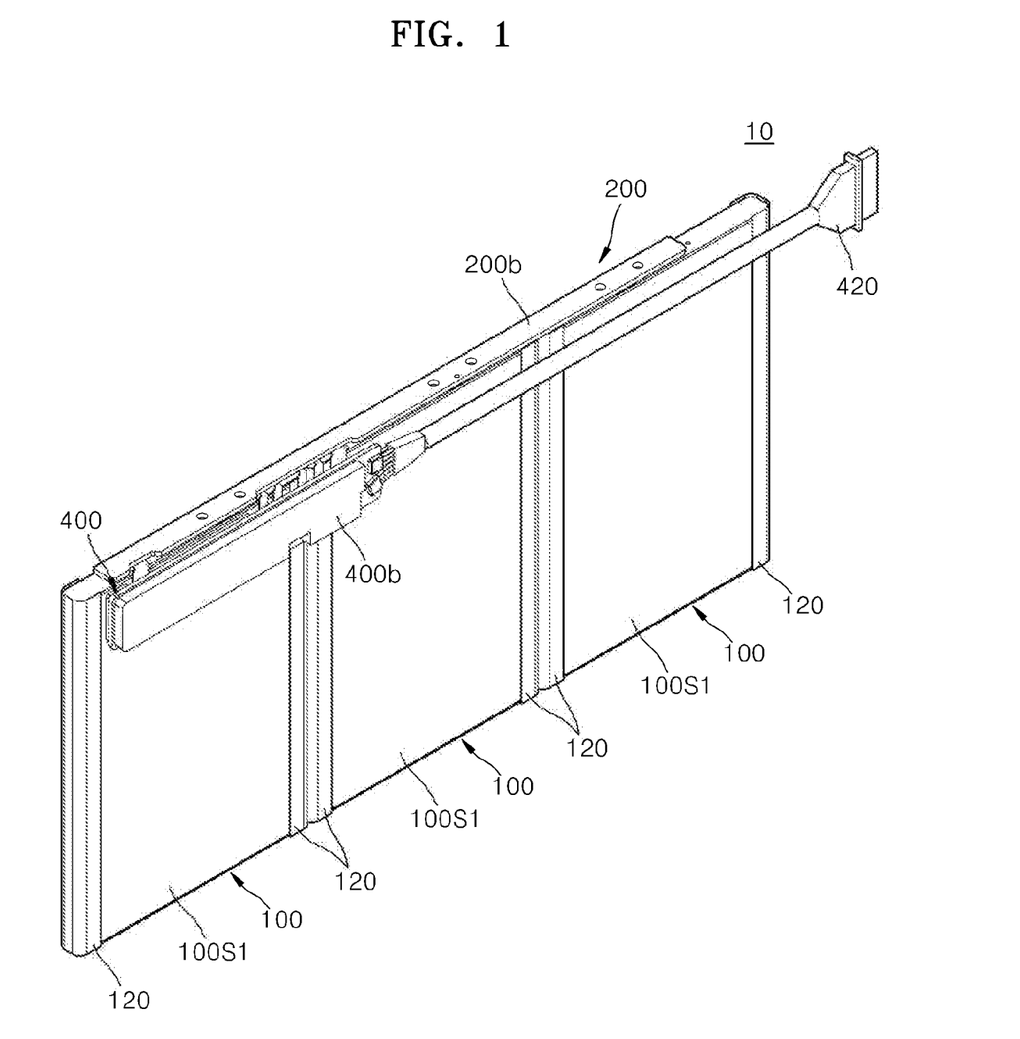
FIG. 1 is a perspective view schematically showing a battery pack according to an embodiment of the present invention.
Figure 2:
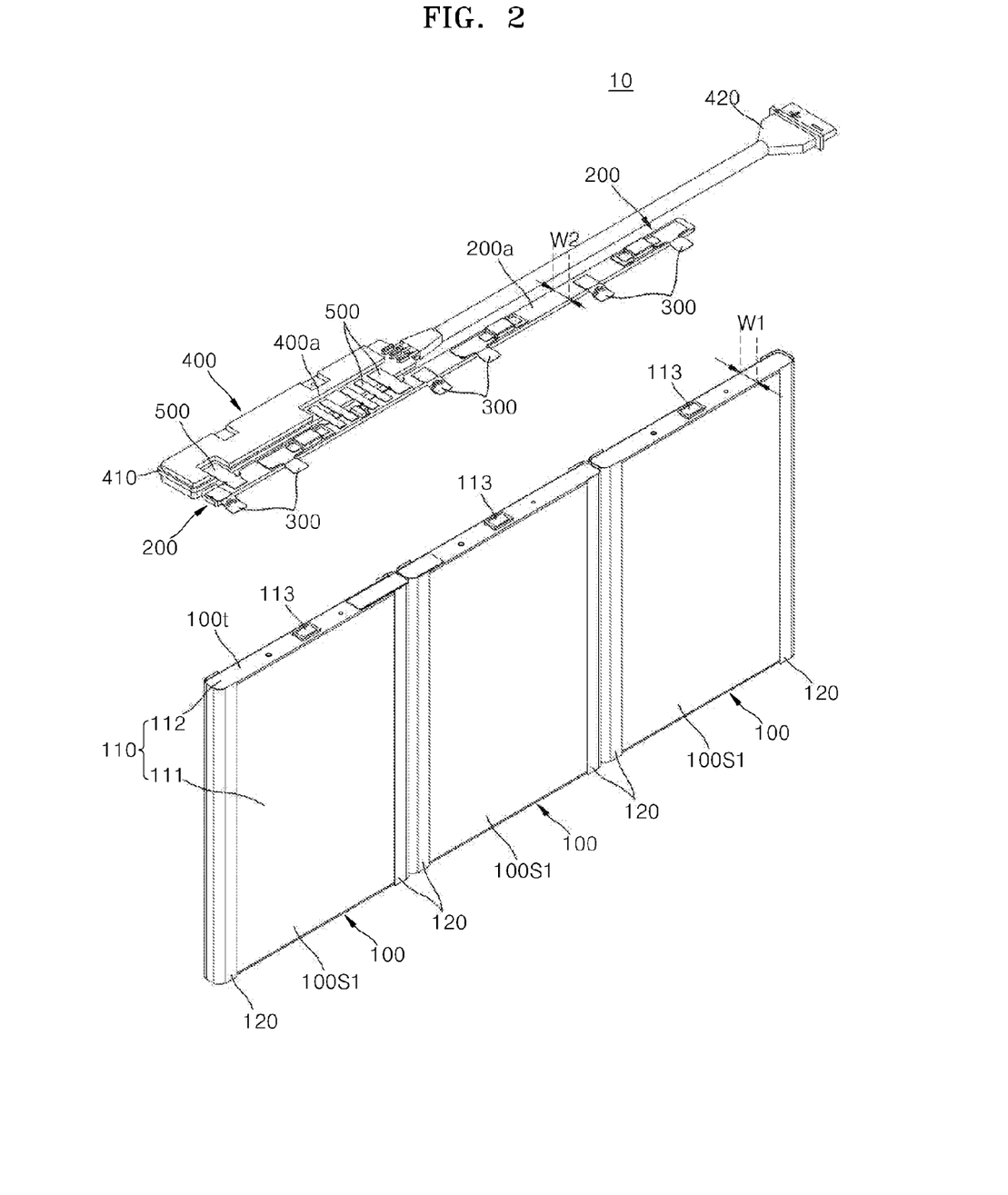
FIG. 2 is an exploded perspective view showing a status of a battery pack before a connecting substrate and a protection circuit module are positioned by bending tabs and leads in the process of manufacturing the battery pack.
Figure 3:
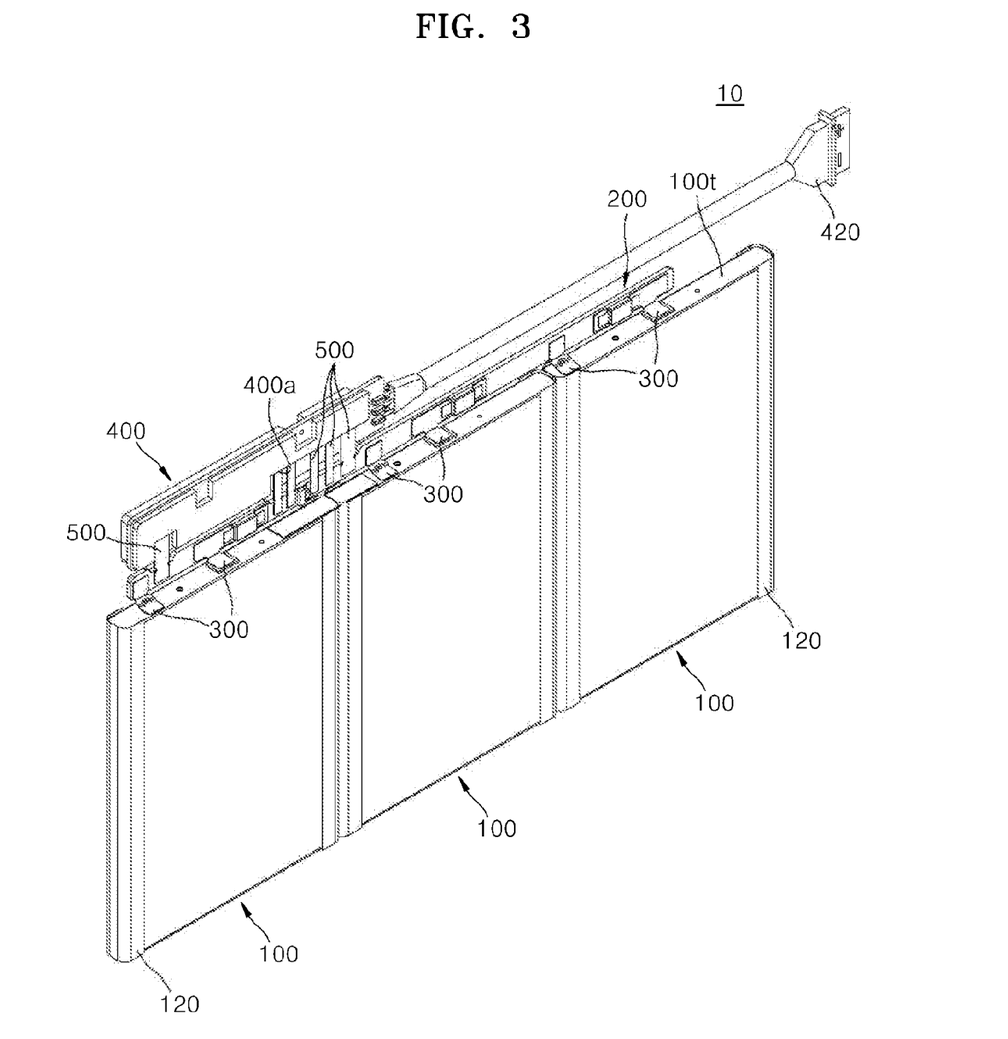
FIG. 3 is an exploded perspective view showing a status of a battery pack when tabs are bent so that a connecting substrate is disposed on an upper surface of a unit battery in the process of manufacturing the battery pack.

FIG. 1 is a perspective view schematically showing a battery pack according to an embodiment of the present invention. FIG. 2 is an exploded perspective view showing a status of a battery pack before a connecting substrate and a protection circuit module are positioned by bending tabs and leads in the process of manufacturing the battery pack. FIG. 3 is an exploded perspective view showing a status of a battery pack when tabs are bent so that a connecting substrate is disposed on an upper surface of a unit battery in the process of manufacturing the battery pack.

Referring to FIGS. 1 to 3, a battery pack 10 may include a plurality of unit batteries 100, a connecting substrate 200 which electrically connects the plurality of the unit batteries 100, tabs 300, a protection circuit module 400, and a lead 500, according to an embodiment of the present invention.

Each unit battery 100 is a rechargeable battery and may include a lithium-ion battery. The unit battery 100 includes an electrode assembly and a can 110 which accommodates the electrode assembly and an electrolyte. The electrode assembly may be manufactured by the following operations of stacking a positive electrode plate, a negative electrode plate, and a separator interposed between the positive electrode plate and the negative electrode plate, and winding the stacked result into the form of a jelly roll. The electrode assembly is accommodated in the can 110 which may be a prismatic type, and for this the can 110 includes a body 111 whose top surface is opened and a cap plate 112 which seals an opening surface of the body 111. The electrode assembly is accommodated in the body 111 through an opening, and after the electrode assembly has been accommodated, the opening is sealed by the cap plate 112. The cap plate 112 is coupled with the body 111 by welding, and after the cap plate 112 has been welded to the body 111, an electrolyte may be injected through an inlet.

The unit battery 100 may be of a prismatic type that has an upper surface, a lower surface, first and second side surfaces which are extended from longer sides of the upper and lower surfaces and are in parallel with each other, and third and fourth side surfaces which are extended from shorter sides of the upper and lower surfaces and are in parallel with each other.

The unit batteries 100 may be disposed side-by-side along a direction. For example, in order that the third surface of one unit battery 100 and the fourth surface of another neighbor unit battery 100 face each other, the unit batteries 100 may be disposed side-by-side. The can 110 configuring the unit battery 100 may be fabricated with a metallic material, in order to maintain strength to prevent damage that may occur due to a fall or an external impact. For example, the can 110 may be made of aluminum or aluminum alloys. Since the can 110 includes the metallic material, the unit batteries 100 which are disposed side-by-side may cause an unnecessary short circuit through the side surfaces. Therefore, the third side surface and the fourth side surface of the unit battery 100 may be covered with insulating materials 120 such as insulating tape.

A positive electrode and a negative electrode of the unit battery 100 may be formed on the upper surface of the unit battery 100, that is, on the cap plate 112. The negative electrode plate of the electrode assembly is electrically connected to an electrode terminal 113 on the cap plate 112, and the positive electrode of the electrode assembly is electrically connected to the cap plate 112. Thus, the electrode terminal 113 may form the negative electrode of the unit battery 100, and the cap plate 112 may form the positive electrode of the unit battery 100. According to the present embodiment, the case where the electrode terminal 113 is the negative electrode and the cap plate 112 is the positive electrode has been described, but according to another embodiment, the electrode terminal 113 may be the positive electrode and the cap plate 112 may be the negative electrode.

The connecting substrate 200 electrically connects a plurality of the unit batteries 100. For example, the connecting substrate 200 may connect a plurality of unit batteries 100 in series, in parallel, or in series/parallel. The connecting substrate 200 may be a printed circuit board (PCB) on which a circuit pattern for electrically connecting the unit batteries 100 is printed.

The tab 300 electrically connects the connecting substrate 200 and the unit batteries 100. As shown in FIGS. 2 and 3, one side of each tab 300 may be coupled to the connecting substrate 200, and the other side of the tab 300 may be coupled to the negative electrode and/or the positive electrode of the unit battery 100. The tab 300 may be coupled to the connecting substrate 200 and the unit battery 100 by welding (for example, laser welding).

The tab 300 which is disposed and coupled on a first surface 200a of the connecting substrate 200 and an upper surface 100t of the unit battery 100, is bent in order that the connecting substrate 200 is disposed in parallel with the upper surfaces the unit batteries 100 as shown in FIG. 1. For example, the tab 300 may be bent in order that one side of the tab 300, which is directly coupled to the connecting substrate 200, substantially parallels the other side of the tab 300 which is directly coupled to the unit batteries 100. By bending the tab 300, as shown in FIG. 1, the connecting substrate 200 may be disposed on the upper surfaces 100t of the unit batteries 100 and thus a second surface 200b (which is opposite to the first surface) of the connecting substrate 200 is exposed to the outside. Here, since the width (w2) of the connecting substrate 200 is substantially the same as the width (w1) of the upper surface 100t of the unit battery 100, the space occupied by the connecting substrate 200 which is disposed on the upper surface of unit battery 100 is reduced, to thus improve volume efficiency of the battery pack 10.

The unit batteries 100 are coupled in series or/and in parallel, by the tabs 300 which are welded to the connecting substrate 200 and the unit batteries 100, and a circuit pattern which is printed on the inside of the connecting substrate 200.

Since a substrate in which the circuit pattern is printed so as to electrically connect the unit batteries 100 is used as the connecting substrate 200, separate metallic plates may not be provided so as to connect the unit batteries 100 in series/parallel. This prevents wires from being disconnected between the metallic plates. Further, this allows the unit batteries to be easily connected by just welding between the tab 300 and the connecting substrate 200 and by just welding between the tab 300 and the positive electrode/negative electrode of the unit battery 100. In addition, because the connecting substrate 200 has a rigid characteristic, the connecting substrate 200 which is disposed in parallel with the upper surfaces of the unit batteries 100 may be prevented from being disordered. Further, the connecting substrate 200 and the upper surfaces of the unit batteries 100 may be prevented from causing an unnecessary short circuit.

A protection circuit module 400 is electrically connected to the connecting substrate 200. The protection circuit module 400 is electrically connected to some of the unit batteries 100 through the connecting substrate 200, and therefore overheating and explosion caused by overcharge, overdischarge, or overcurrent of the unit batteries 100 may be prevented. The protection circuit module 400 may include a protection device (not shown) which is mounted to a substrate and one side or the inside of the substrate. The protection device may selectively include a safety element such as a passive element, e.g., a resistor or a capacitor and an active element, e.g., a field effect transistor (FET), and integrated circuits. A connector 420 for supplying power to external electronic devices may be provided at one side of the protection circuit module 400.

A plurality of leads 500 may electrically connect the connecting substrate 200 and the protection circuit module 400. As shown in FIGS. 2 and 3, one side of the lead 500 may be connected to the protection circuit module 400, and the other side thereof may be coupled to the connecting substrate 200. The lead 500 may be coupled to the protection circuit module 400 and the connecting substrate 200 by welding.

As shown in FIG. 1, the lead 500, which is disposed and coupled on a first surface 400a of the protection circuit module 400 and on a first surface 200a of the connecting substrate 200, may be bent in order that the protection circuit module 400 is disposed in parallel with the sides of the unit batteries 100, for example, the first side surfaces 100s1 of the unit batteries. For example, the lead 500 may be bent in order that one side of each lead 500, which is directly coupled to the protection circuit module 400, and the other side thereof, which is directly coupled to the connecting substrate 200, are substantially perpendicular to each other. The protection circuit module 400 is substantially perpendicularly disposed relative to the connecting substrate 200 as the lead 500 is bent. That is, the protection circuit module 400 is disposed on the first side surfaces 100s1 of the unit batteries 100. Through such a configuration, the space which the protection circuit module 400 occupies in the battery pack 10 is minimized, and therefore the compact battery pack 10 may be manufactured.

Hereinbelow, with reference to FIGS. 4 and 5, a more specific configuration of a connecting substrate, tabs, a protection circuit module, and leads of the battery pack 10 according to an embodiment of the present invention will be described.

Figure 4:
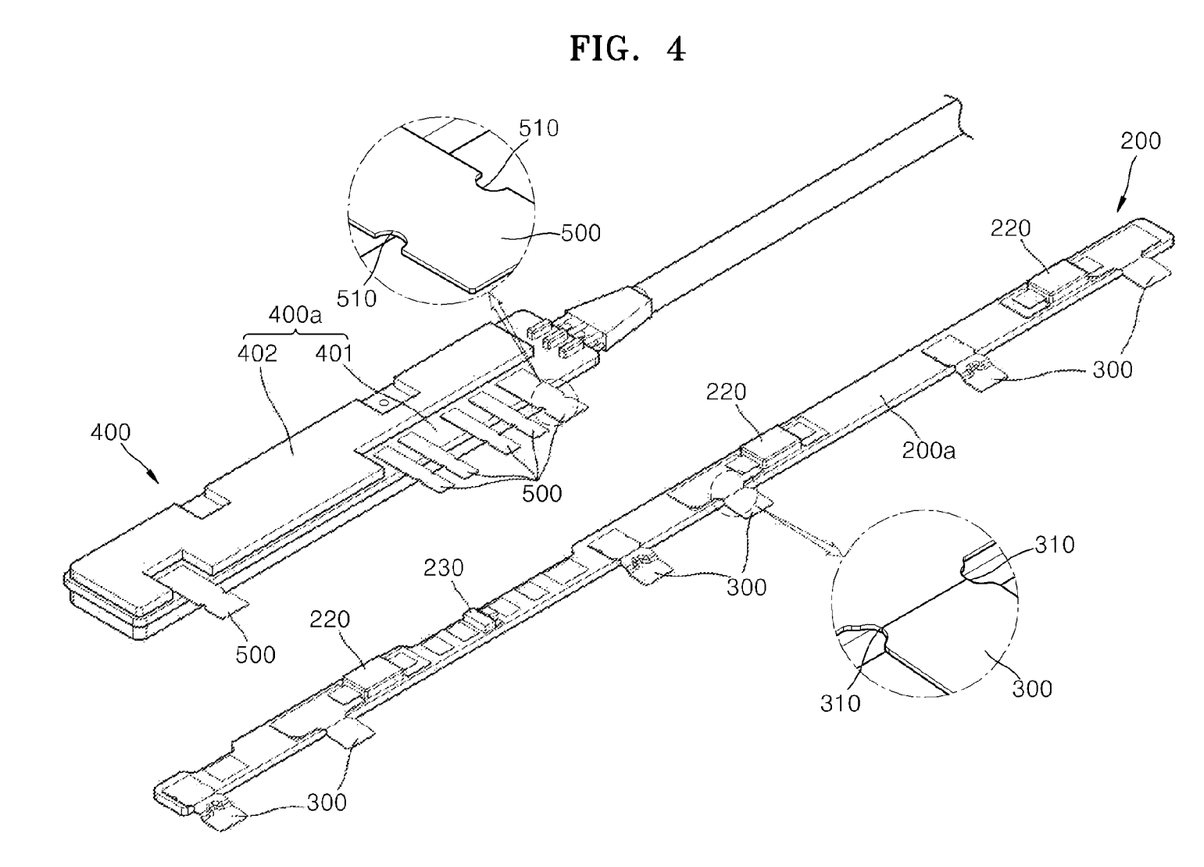
FIG. 4 is an exploded perspective view showing some portions extracted from an assembly of a connecting substrate and a protection circuit module shown in FIG. 2.
Figure 5:
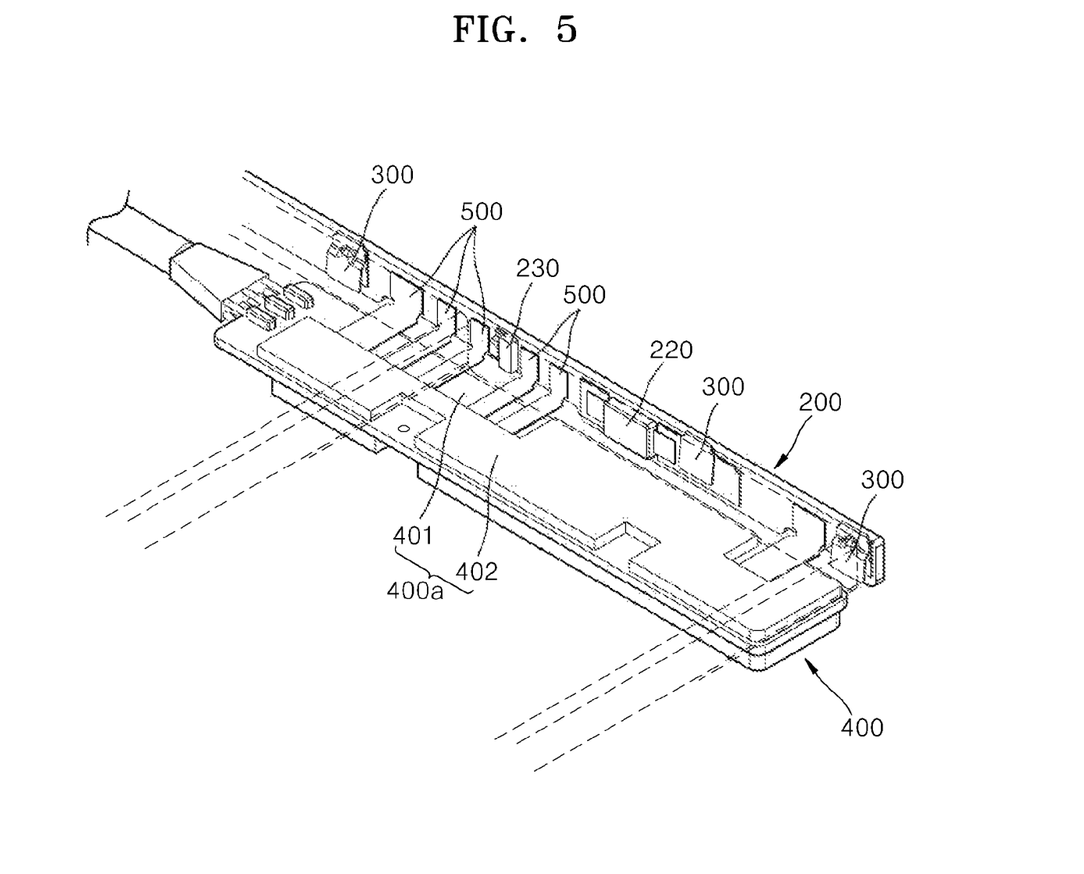
FIG. 5 is a perspective view showing some portions extracted from a connecting substrate and a protection circuit module shown in FIG. 1.

FIG. 4 is an exploded perspective view showing some portions extracted from an assembly of a connecting substrate and a protection circuit module shown in FIG. 2, and FIG. 5 is a perspective view showing some portions extracted from a connecting substrate and a protection circuit module shown in FIG. 1. In FIG. 5, a unit battery is indicated with dotted lines for convenience of explanation.

Referring to FIG. 4, one side of each of tabs 300 is welded on a first surface 200a of a connecting substrate 200, and, one side of each of leads 500 may be welded on a first surface 400a of a protection circuit module 400.

As described above, a circuit pattern is formed in the inside of the connecting substrate 200, to electrically connect the unit batteries 100, and the taps 300 are disposed on the first surface 200a of the connecting substrate 200 so as to connect the unit batteries 100. One side of each tab 300 may be welded just on the first surface 200a of the connecting substrate 200, and the other side thereof may be directly welded to a positive electrode/negative electrode of the unit battery 100.

As the tabs 300 are bent, the connecting substrate 200 may be disposed on the upper surfaces of the unit batteries 100. Here, each tap 300 may include a notch 310 which is formed along the width direction of the tab 300 in order to facilitate bending of the tabs 300. The notch may be formed on both sides along the width direction of the tab 300, and therefore the width of a bending area in which the notch 310 is formed is smaller than the width of a non-bending area.

A temperature device 220 may be disposed on the first surface 200a of the connecting substrate 200. The temperature device 220 may be coupled to the tab 300 and a part of the circuit pattern which is exposed to the outside. The temperature device 220 may include a temperature cutoff (TCO). The temperature device 220 may perform a function as a fuse that shuts off current if the temperature of the unit batteries 100 exceeds a reference value.

Referring to FIGS. 1 and 5, the connecting substrate 200 is disposed on upper surfaces 100t of the unit batteries 100 by bending the tab 300. In other words, the first surface 200a of the connecting substrate 200 in which the temperature device 220 is disposed faces the upper surfaces 100t of the unit batteries 100. Since the temperature device 220 is disposed in contact with or adjacent to the upper surfaces 100t of the unit batteries 100, the temperature device 220 may be responsive to a temperature change of the unit battery 100, to thus improve efficiency of the temperature management of the unit batteries 100.

A protrusion 230 which has the same height as the temperature device 220 may be formed on the first surface 200a of the connecting substrate 200. Since the protrusion 230 has the same height as the height of the temperature device 220, the protrusion 230 and temperature device 220 compensate for a gap between the upper surface 100t of the unit battery 100 and the connecting substrate 200 which is spaced apart by a predetermined spacing from the upper surface 100t of the unit battery by the temperature device 220. Therefore, the connecting substrate 200 may be prevented from being damaged.

A plurality of leads 500 are disposed on a first surface 400a of a protection circuit module 400 so as to connect to the connecting substrate 200. One side of each lead 500 is welded just on the first surface 400a of the protection circuit module 400, and the other side thereof may be rightly welded on the first surface 200a of the connecting substrate 200.

The first surface 400a of the protection circuit module 400 may include a first area 401 and a second area 402 which is formed to protrude from the first area 401. The lead 500 may be welded on the first area 401, and the second area 402 may be provided with a space in which protection devices are mounted.

The protection circuit module 400, as shown in FIGS. 1 and 5, may be disposed on the side surfaces of the unit batteries 100, for example, on the first surfaces 100s1 of the unit batteries 100 as the leads 500 are bent. Here, in order to facilitate the bending of the lead 500, the lead 500 may include a notch 510 which is formed along the width direction of the lead 500. The notches 510 may be formed on both sides along the width direction of the lead 500, and therefore the width of a bending area in which the notch 510 is formed may be formed smaller than the width of a non-bending area.

The first surface 400a of the protection circuit module 400 faces the first surfaces 100s1 of the unit batteries 100 by bending of the lead 500. Here, since the second area 402 is protruded compared to the first area 401 in the first surface 400a of the protection circuit module 400, the second area 402 of the first surface may be in contact with or adjacent to the first side surfaces 100s1 of the unit batteries 100. On the contrary, the first area 401 on which the leads 500 are welded may form a predetermined gap spaced apart from the first side surface 100s1 of each unit battery 100.

According to an embodiment of the present invention, since the can 110 of each unit battery 100 includes a metallic material, the can 110 may have a polarity. In this case, if the first area 401 in which the leads 500 are welded is proximately disposed enough to contact the first side surfaces 100s1 (or the second side surfaces) of the unit batteries 100, a short circuit may occur between the lead 500 and the unit battery 100. However, according to an embodiment of the present invention, the second area 402 of the first surface 400a of the protection circuit module 400 is formed to protrude compared to the first area 401, and thus a sufficient space is formed to mount the protective devices, and the space is formed between the can 110 and each lead 500 which is on the first area 401, to thus prevent occurrence of an unnecessary short-circuit between each lead 500 and the can 110.

As described above, according to the one or more embodiments of the present invention, an electrical connection of a plurality of unit batteries may be easily and stably accomplished through only relatively simple welding by using a connecting substrate. In addition, the connecting substrate and the protection circuit module are positioned adjacently to the unit batteries by bent tabs and bent leads, thereby maximizing space utilization of the battery pack and providing compactness.

It should be understood that the exemplary embodiments described herein should be considered in a descriptive sense only and not for purposes of limitation. Descriptions of features or aspects within each embodiment should typically be considered as available for other similar features or aspects in other embodiments.

The scope of the present application should not be limited to the foregoing discussion, but should be defined by the appended claims.

What is claimed is:

1. A battery pack comprising:
   unit batteries disposed in parallel with each other, a case of each of the unit batteries is prismatic type including first and second sides which are in parallel with each other, and third and fourth sides which are in parallel with each other, wherein at least one of the third and fourth sides is covered with an insulating material, and at least portions of the first and second sides are not covered with the insulating material;
   a connecting substrate for electrically coupling the unit batteries in series, parallel, or a combination thereof, and disposed adjacent to upper surfaces of the unit batteries;
   a plurality of tabs which are disposed between the unit batteries and the connecting substrate;
   a protection circuit module, including a substrate and a protection device, and disposed adjacent to the first or second sides of the batteries; and
   a lead, which is disposed between the connecting substrate and the protection circuit module and connect the connecting substrate and the protection circuit module.

2. The battery pack according to claim 1, wherein the lead is bent so that one side of the lead and the other side thereof are substantially perpendicular to each other.

3. The battery pack according to claim 1, wherein the connecting substrate is disposed adjacent to upper surfaces of the unit batteries by the bent tabs.

4. The battery pack according to claim 3, wherein each unit battery comprises a negative electrode and a positive electrode on the upper surface thereof, and a width of the connecting substrate is substantially equal to a width of the upper surface of the unit battery.

5. The battery pack according to claim 3, wherein the protection circuit module is disposed adjacent to the side surface of the unit batteries by the bent lead.

6. The battery pack according to claim 1, wherein the protection circuit module is disposed along a substantially perpendicular direction to the connecting substrate.

7. The battery pack according to claim 1, wherein the connecting substrate comprises a temperature device which is disposed on a first surface of the connecting substrate.

8. The battery pack according to claim 7, wherein the temperature device is disposed to face the first surface of the unit batteries.

9. The battery pack according to claim 7, wherein the connecting substrate further comprises a protrusion which is formed on the first surface of the connecting substrate.

10. The battery pack according to claim 9, wherein the height of the protrusion is substantially the same as the height of the temperature device.

11. The battery pack according to claim 1, wherein a first surface of the protection module circuit comprises:
    a first area that is in contact with the lead; and
    a second area which is formed around the first area and protrudes from the first area to thus form a step.

12. The battery pack according to claim 11, wherein one surface of the lead is adjacent to the first area, and the first area and the second surface of the unit batteries are spaced away from each other to form a gap.

13. The battery pack according to claim 12, wherein each of the unit batteries comprises an electrode assembly which comprises a positive electrode plate, a negative electrode plate, and a separator which is interposed between the positive electrode plate and the negative electrode plate, and a can that comprises a metallic material and accommodates the electrode assembly.

14. The battery pack according to claim 1, wherein each of the tab and the lead comprises a notch which is formed in a widthwise direction.

15. A battery pack comprising:
    unit batteries disposed in parallel with each other, each of the unit batteries including first and second sides which are in parallel with each other, and third and fourth sides which are in parallel with each other, wherein at least one of the third and fourth sides is covered with an insulating material, and at least portions of the first and second sides are not covered with the insulating material;
    a connecting substrate for electrically coupling the unit batteries in series parallel, or a combination thereof;
    a plurality of tabs electrically connecting the unit batteries and the connecting substrate such that the unit batteries and the connecting substrate are electrically coupled, each tab having a surface with a first side and a second side, wherein the first side of each tab is welded to the connecting substrate and the second side thereof is welded to an electrode of each unit battery, and the tabs are bent with the first side and second side of each tab being substantially parallel with each other;
    a protection circuit module including a substrate and a protection device, and disposed adjacent to the first or second sides of the batteries; and
    a lead which is disposed between the connecting substrate and the protection circuit module and connect the connecting substrate and the protection circuit module.

16. The battery pack according to claim 15, wherein
    each of the first surfaces of the unit batteries is an upper surface of each unit battery in which an positive electrode and a negative electrode are formed, and
    a second surfaces of the unit batteries are side surfaces of the unit batteries.

17. The battery pack according to claim 15, wherein the connecting substrate further comprises a temperature device which is formed on a surface which faces the first surfaces of the unit batteries.

18. The battery pack according to claim 17, wherein the connecting substrate further comprises a protrusion which is formed on the surface which faces the first surfaces of the unit batteries and protrudes toward the first surfaces of the unit batteries.

19. The battery pack according to claim 15, wherein a surface which faces a second surfaces of the unit batteries in the protection circuit module comprises:
    a first area that is in contact with the lead; and
    a second area which is formed around the first area and protrudes from the first area to form a step.

20. The battery pack according to claim 15, wherein one side of the lead is connected to the protection circuit module and the other side thereof is connected to the connecting substrate, and the lead is bent so that the protection circuit module is disposed adjacent to second surfaces of the unit batteries.

* * * * *